(12) United States Patent
Cui et al.

(10) Patent No.: US 11,844,146 B2
(45) Date of Patent: Dec. 12, 2023

(54) TECHNOLOGIES FOR POSITIONING ENHANCEMENT IN UNLICENSED SPECTRUM

(71) Applicant: Apple Inc., Cupertino, CA (US)

(72) Inventors: Jie Cui, San Jose, CA (US); Yang Tang, San Jose, CA (US); Dawei Zhang, Saratoga, CA (US); Hong He, San Jose, CA (US); Manasa Raghavan, Sunnyvale, CA (US); Weidong Yang, San Diego, CA (US); Seyed Ali Akbar Fakoorian, San Diego, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 17/348,629

(22) Filed: Jun. 15, 2021

(65) Prior Publication Data
US 2022/0086624 A1 Mar. 17, 2022

Related U.S. Application Data

(60) Provisional application No. 63/078,689, filed on Sep. 15, 2020.

(51) Int. Cl.
*H04W 64/00* (2009.01)
*H04W 8/24* (2009.01)
*H04W 74/08* (2009.01)

(52) U.S. Cl.
CPC ............. *H04W 8/24* (2013.01); *H04W 64/00* (2013.01); *H04W 74/0808* (2013.01)

(58) Field of Classification Search
None
See application file for complete search history.

(56) References Cited

U.S. PATENT DOCUMENTS

2020/0264261 A1* 8/2020 Akkarakaran ........ H04W 76/27
2021/0051623 A1* 2/2021 Manolakos ............. H04L 5/005

OTHER PUBLICATIONS

3rd Generation Partnership Project; Technical Specification Group Radio Access Network; LTE Positioning Protocol (LPP) (Release 16), 3GPP TS 37.355 V16.1.0, Jul. 2020, 292 pages.
3rd Generation Partnership Project; Technical Specification Group Radio Access Network; NR;Requirements for support of radio resource management (Release 16), 3GPP TS 38.133 V16.4.0, Jun. 2020, pp. 31-321.
3rd Generation Partnership Project; Technical Specification Group Radio Access Network; NG Radio Access Network (NG-RAN); Stage 2 functional specification of User Equipment (UE) positioning in NG-RAN (Release 16), 3GPP TS 38.305 V16.1.0, Jul. 2020, 114 pages.
3rd Generation Partnership Project; Technical Specification Group Radio Access Network; NG-RAN; NR Positioning Protocol A (NRPPa) (Release 16), 3GPP TS 38.455 V16.0.0, Jul. 2020, 60 pages.
Fischer, Observed Time Difference of Arrival (OTDOA) Positioning in 3GPP LTE, Qualcomm Technologies, Inc., Jun. 6, 2014, 62 pages.

* cited by examiner

*Primary Examiner* — Suhail Khan
(74) *Attorney, Agent, or Firm* — Kilpatrick Townsend & Stockton LLP

(57) ABSTRACT

The present application relates to devices and components including apparatus, systems, and methods to provide positioning enhancements on unlicensed spectrum.

20 Claims, 11 Drawing Sheets

800 

```
┌─────────────────────────────────────────────────────────┐
│ Performing one or more positioning measurements on a    │
│ reference signal                                        │
│ 804                                                     │
└─────────────────────────────────────────────────────────┘
                             │
                             ▼
┌─────────────────────────────────────────────────────────┐
│ Determining a number of reference signal occasions in   │
│ which the reference signal is not available             │
│ 808                                                     │
└─────────────────────────────────────────────────────────┘
                             │
                             ▼
┌─────────────────────────────────────────────────────────┐
│ Extending the measurement period based on the number    │
│ 812                                                     │
└─────────────────────────────────────────────────────────┘
```

FIG. 8

TECHNOLOGIES FOR POSITIONING ENHANCEMENT IN UNLICENSED SPECTRUM

CROSS REFERENCE TO RELATED APPLICATIONS

This application claims the benefit of U.S. Provisional Application No. 63/078,689, filed Sep. 15, 2020, which is hereby incorporated by reference in its entirety for all purposes.

BACKGROUND

Third Generation Partnership Project (3GPP) relies on observed time difference of arrival (OTDOA) positioning procedures to determine a position of a user equipment (UE). A user equipment (UE) may measure time differences between reference signals transmitted by a plurality of base stations. Reports based on these measurements may be transmitted to a location server to calculate the position of the UE. Signaling and operational aspects for OTDOA and other positioning procedures may need to be developed to accommodate new network technologies.

BRIEF DESCRIPTION OF THE DRAWINGS

FIG. 8 illustrates an operational flow/algorithmic structure in accordance with some embodiments.

DETAILED DESCRIPTION

Figure 1:
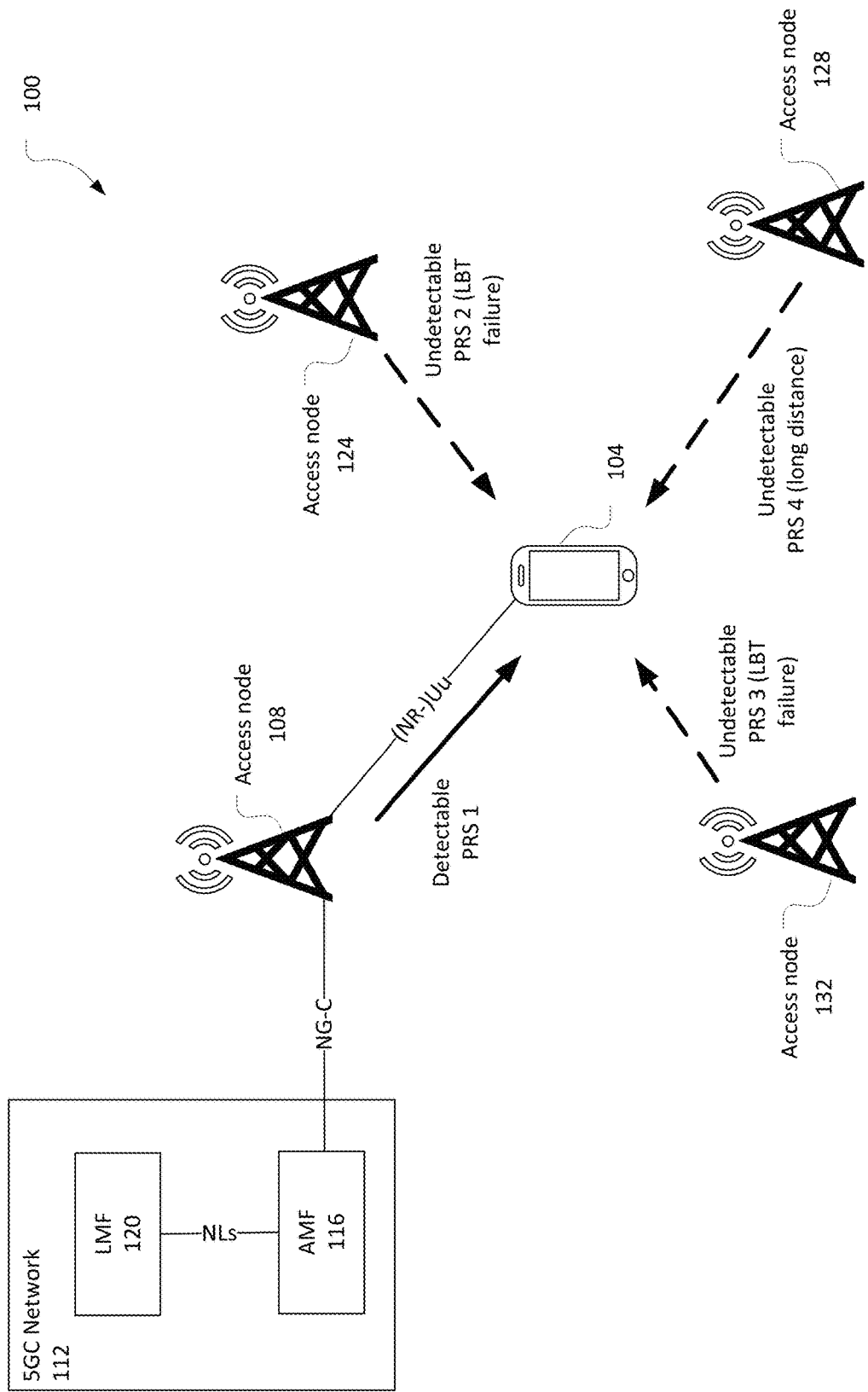
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include UE 104 that may operate in accordance with, or in a manner compatible to, Long Term Evolution (LTE), or Fifth Generation (5G) New Radio (NR) system standards as provided by 3GPP technical specifications. The UE 104 may be a mobile phone, consumer electronic device, tablet computer, wearable computer device, vehicular computer device, infrastructure equipment, sensor, etc. The UE 104 may be similar to, and substantially interchangeable with, UE 1000 described with respect to FIG. 10

The UE 104 may communicate with an access node 108 that may be, for example, a base station that provides a wireless access cell, for example, an LTE cell or an NR cell. The access node 108 may be similar to, and substantially interchangeable with, network node 1100 described with respect to FIG. 11.

The access node 108 may be an ng-eNB to provide an LTE access cell and be coupled with a 5G core (5GC) network 112; or a gNB to provide an NR access cell and be coupled with the 5GC network 112. The access node 108 and the UE 104 may communicate with one another over an air interface that may be referred to as a Uu interface if the access cell is an LTE cell, or an NR-Uu interface if the access cell is an NR cell.

The access node 108 may be coupled with the 5GC network 112 via a backhaul connection that may support an NG-C interface. The 5GC network 112 may provide the UE 104 with various communication services. The 5GC network 112 may include network elements that offer various data and telecommunications services to customers/subscribers (for example, a user of UE 104) who are connected to the 5GC network 112 via the access node 108. The components of the 5GC network 112 may be implemented in one physical node or separate physical nodes including components to read and execute instructions from a machine-readable or computer-readable medium (for example, a machine-readable storage medium). In various embodiments, one or more of the components of the 5GC network 112 may be implemented in the network node 1100 described with respect to FIG. 11.

In some embodiments, network function virtualization (NFV) may be utilized to virtualize any or all of the above-described network node functions via executable instructions stored in one or more computer-readable storage mediums (described in further detail below). A logical instantiation of the 5GC network 112 may be referred to as a network slice, and a logical instantiation of a portion of the 5GC network 112 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more components/functions.

The access node 108 may be coupled with an access and mobility function (AMF) 116 via the NG-C interface. The AMF 116 may be responsible for registration management (e.g., for registering UE 104, etc.), connection management, reachability management, mobility management, lawful interception of AMF-related events, and access authentication and authorization. The AMF 116 may be coupled with a location management function (LMF) 120 via an NLs interface.

The AMF 116 may send a location services request to the LMF 120 with respect to the UE 104. The location services request may be initiated by the AMF 116 or another entity. In response to the request, the LMF 120 may transfer assistance data to the UE 104 to assist with positioning operations. The assistance data may be tailored to the type of positioning operation that is to be performed. In general, the assistance data may include information about access nodes in the vicinity of the UE 104 and reference signal parameters corresponding to reference signals transmitted by the access nodes, which form a basis for the positioning measurements. The reference signal parameters may include, for example, bandwidth, frequency, periodicity, etc.

For OTDOA positioning, the LMF 120 may configure the UE 104 with assistance data of positioning reference signals (PRSs) of access nodes in the vicinity of the UE 104. The access nodes in the vicinity of the UE 104 may include access node 108, access node 124, access node 128, and access node 132. Access node 108 may be the serving access node, while access nodes 124, 128, and 132 may be neighbor access nodes. The assistance data of the PRSs, which may include timing and frequency information, may be based on information that the various access nodes provide to the LMF 120. In some embodiments, the access nodes may include base stations or transmit-receive points (TRPs)/transmit points (TPs), such as remote radio heads (RRHs) or downlink-PRS-only TPs. One access node, for example, access node 108, may control one or more TRPs/TPs to support PRS-based positioning operations.

The UE 104 may perform PRS measurements based on assistance data of the PRSs received from the LMF 120. In some embodiments, the PRS measurements may be the basis for reference signal time difference (RSTD) measurements. An RSTD measurement may include a measured time offset between PRSs from different access nodes. The UE 104 may then report the RSTD measurement results to the LMF 120. The LMF 120 may use a multilateration technique to determine the position of the UE 104 based on the RSTD measurements and knowledge of the locations of the access nodes transmitting the PRSs.

In some embodiments, the assistance data may be provided to the UE 104 in one or more information elements (IEs) that provide assistance data with respect to a reference cell (for example, the cell provided by serving access node 108) and one or more neighbor cells (for example, cells provided by access nodes 124, 128, and 132) to support the RSTD measurements.

In 3GPP Release 16 NR OTDOA positioning, a legacy UE may always expect transmission of the PRSs listed in the assistance data. If the PRS cannot be detected, the legacy UE may assume the transmitting access node is not detectable. The access node will keep transmitting the PRS at the specific timing and frequency resources as indicated in the assistance data provided to a legacy LMF. The legacy LMF will always expect transmission of the PRSs in the assistance data by the corresponding access nodes for positioning purposes.

In NR-unlicensed (NR-U) bands, nodes of a radio access network may perform medium- (or carrier-) sensing operations to determine whether one or more channels in the unlicensed spectrum is unavailable or otherwise occupied prior to transmitting in the unlicensed spectrum. The medium/carrier-sensing operations may be performed according to a listen-before-talk (LBT) protocol.

An LBT operation may be include a node (for example, UE 104 or access node 108) sensing a medium (for example, a channel or carrier frequency) and transmitting when the medium is sensed to be idle (or when a specific channel in the medium is sensed to be unoccupied). The medium sensing operation may include clear channel assessment (CCA), which utilizes energy detection (ED) to determine the presence or absence of other signals on a channel in order to determine if a channel is occupied or clear. This LBT operation allows cellular networks to coexist with incumbent systems in the unlicensed spectrum and with other cellular networks. ED may include sensing radio frequency (RF) energy across an intended transmission band for a period of time and comparing the sensed RF energy to a predefined or configured threshold.

If the access node 108 determines a channel is occupied, resulting in an LBT failure, the access node 108 may not be able to transmit reference signals at a particular time/frequency resource. Legacy UEs and LMFs may register an error case if a PRS cannot be detected from nearby access nodes, when such nodes have LBT failures on PRS transmission occasions. The legacy UE may incorrectly determine that those access nodes are undetectable based on long propagation delays and skip those access nodes. The legacy LMF may receive RSTD measurements with less anchor points (for example, access nodes) and positioning accuracy may be negatively impacted.

PRS 2 from access node 124 and PRS 3 from access node 132 may be initially undetectable due to LBT failures. PRS 4 from access node 128 may also be initially undetectable due to a long distance between the access node 128 and the UE 104, resulting in excessive propagation delays. A legacy UE would determine all three access nodes were undetectable due to, for example, a long distance separation between the legacy UE and the access nodes. The corresponding positioning operation would fail due to only one PRS being detectable, that is, PRS 1 from access node 108. Embodiments of the present disclosure describe enhancements that may enable positioning operations even when one or more PRSs may not be transmitted or detectable due to an LBT failure. In this manner, embodiments may facilitate positioning operations even with potentially inconsistent availability of NR-U spectrum to an access node for transmitting positioning reference signals.

In some embodiments, the UE 104 may transmit positioning capability information, in capability signaling, to facilitate positioning operations in the NR-U spectrum. The positioning capability information may indicate whether the UE 104 supports positioning operations or measurements of reference signals for positioning purposes in NR-U spectrum or on CCA carriers. For example, the positioning capability information may indicate whether the UE 104 supports OTDOA in NR-U spectrum or on CCA carriers. Additionally, or alternatively, the positioning capability information may indicate whether the UE 104 supports PRS measurement in NR-U spectrum or on CCA carriers. In other embodiments, the positioning capability information may correspond to positioning operations other than OTDOA (for example, multiple round trip time (RTT) positioning operations in which the UE determines a relative distance to an access node based on signals transmitted to and reference signals received from the access node) or reference signal measurements based on reference signals other than PRSs (for example, channel state information-reference signals (CSI-RSs) or synchronization signal block (SSB) signals). While various embodiments may be described with respect to OTDOA positioning operations based on PRSs, similar concepts may be applied to other positioning operations based on other reference signals.

Given the new capability signaling, support of particular positioning operations (for example, OTDOA) in NR-U may be considered as optional features for the UE 104. If the UE 104 supports the particular positioning operations, but does not support them in the NR-U spectrum, the network (for example, the 5GC network 112 or the radio access network) will not configure positioning assistance data on the unlicensed carriers for the UE 104.

Figure 2:
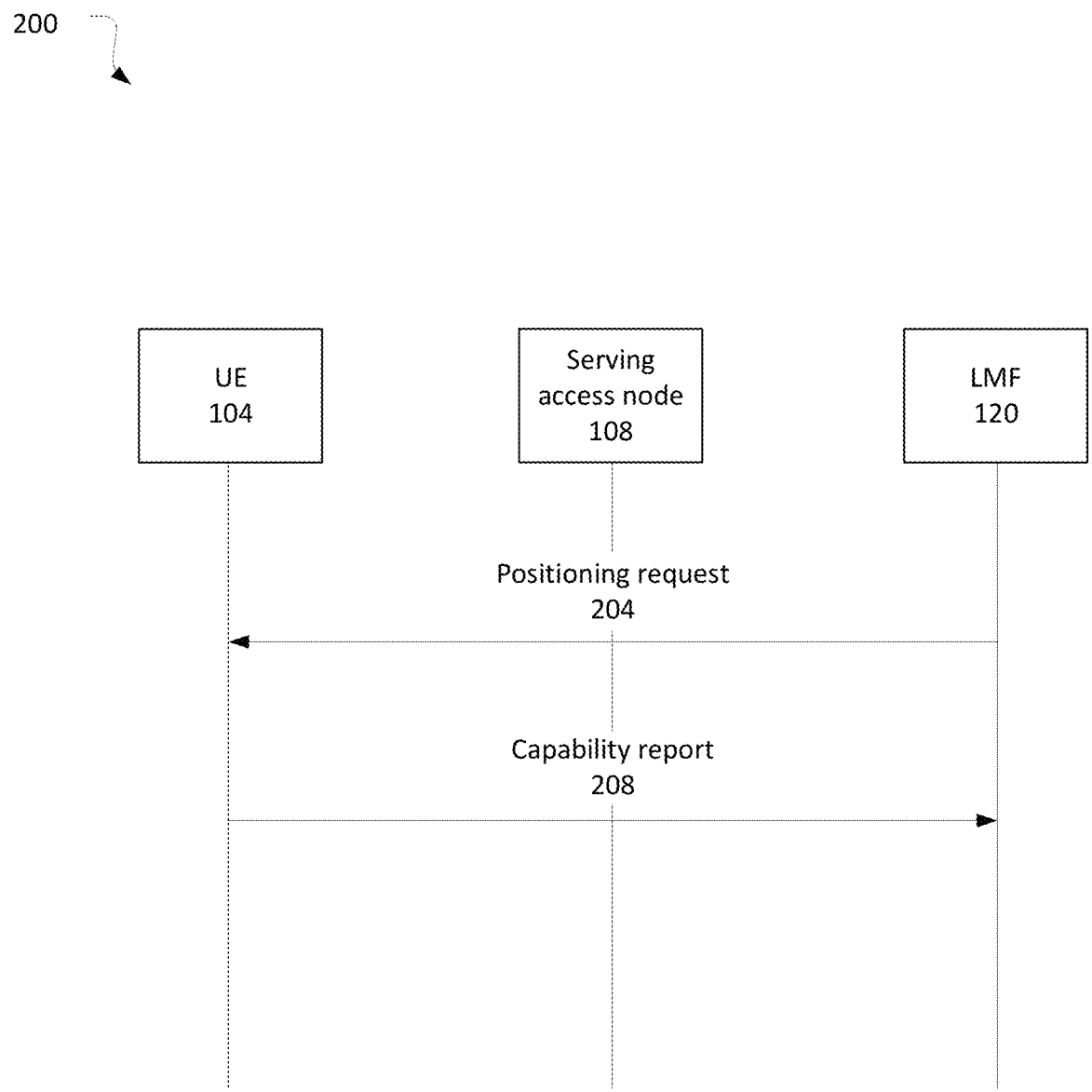
FIG. 2 illustrates a positioning call flow in accordance with some embodiments.

FIG. 2 illustrates a positioning call flow 200 in accordance with some embodiments. The positioning call flow 200 may include messages transmitted between various nodes including, for example, the UE 104, the serving access node 108, and the LMF 120. The positioning call flow 200 may include the LMF 120 sending a positioning request 204 to the UE 104. The positioning request 204 may be a request for positioning capability information of the UE 104. Additionally, or alternatively, the positioning request 204 may be a request for the UE to perform a positioning operation/measurement. For example, the positioning request 204 may be a request for the UE 104 to perform an OTDOA positioning measurement.

The positioning call flow 200 may include the UE 104 sending a capability report 208 to the LMF 120. The capability report 208 may include positioning capability information related to whether the UE 104 supports a positioning operation such as, for example, an OTDOA operation, or measurement in NR-U. As used herein, supporting positioning operation/measurements in NR-U may include supporting positioning operations/measurements on NR unlicensed carriers/bands. An NR unlicensed carrier may also be referred to as a CCA carrier.

In some embodiments, the positioning capability information may be transmitted to the LMF 120 by an LTE positioning protocol (LPP). Except as otherwise described, the LPP signaling performed by the UE 104 and LMF 120 may be consistent with 3GPP Technical Specification (TS) 37.355 v16.1.0 (2020 July).

It may be noted that while the positioning request 204 and the capability report 208 may be sent through the serving access node 108, the information in the request/report may be transparent to the serving access node 108. For example, the LPP encoding of the information may be at a non-access stratum (NAS) layer that is above the access stratum layers of the serving access node 108. Thus, the serving access node 108 may forward the information in containers that are not otherwise processed or accessible to the access node 108.

Figure 3:
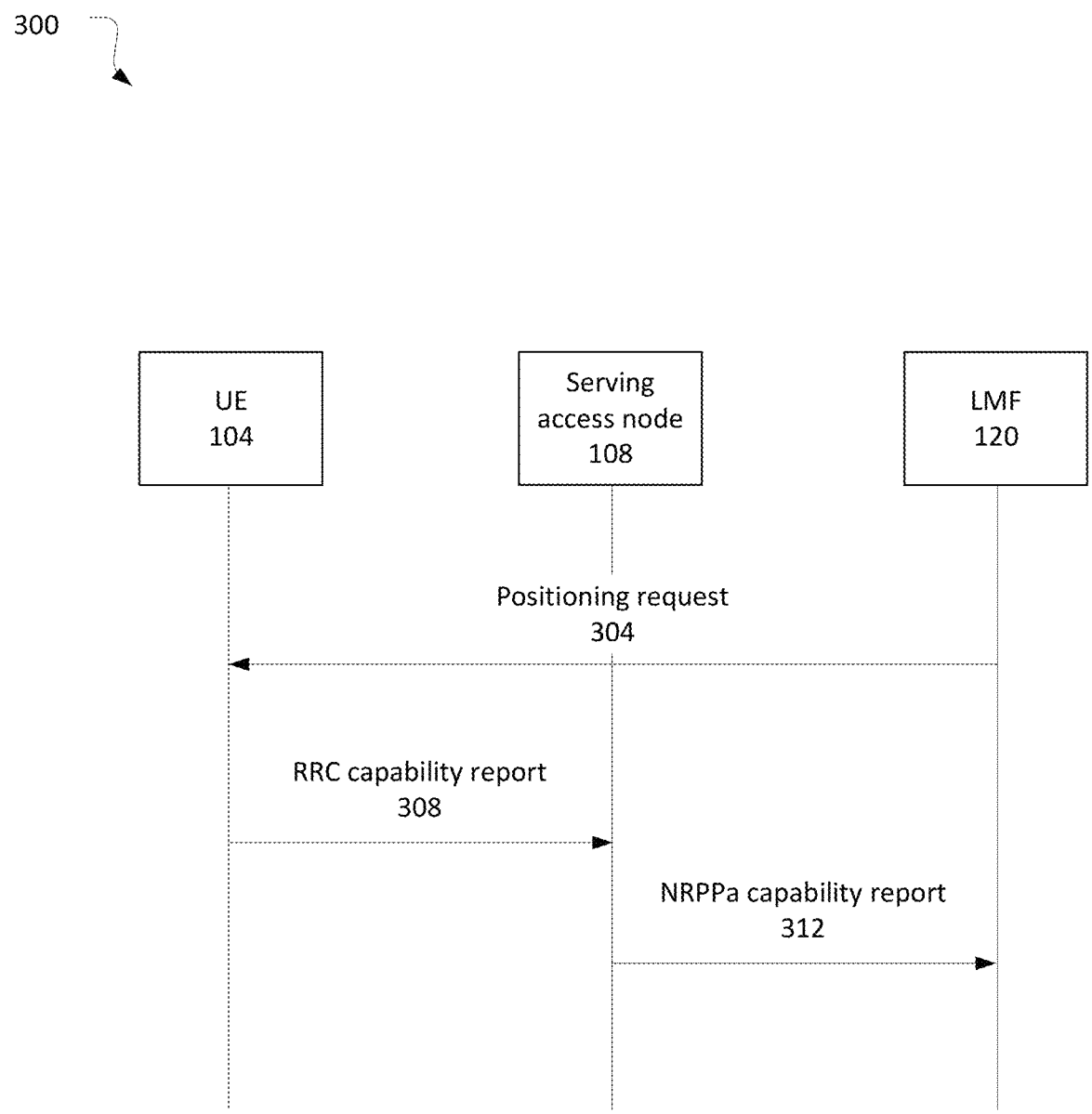
FIG. 3 illustrates a positioning call flow in accordance with some embodiments.

FIG. 3 illustrates another positioning call flow 300 in accordance with some embodiments. Similar to positioning call flow 200, the positioning call flow 300 may include messages transmitted between various nodes including, for example, the UE 104, the serving access node 108, and the LMF 120. The positioning call flow 300 may include the LMF 120 sending a positioning request 304 to the UE 104. The positioning request 304 may be for positioning capability information of the UE 104. Additionally, or alternatively, the positioning request 304 may be for the UE to perform a positioning operation/measurement. For example, the positioning request 304 may be a request for the UE to perform an OTDOA positioning measurement.

The positioning call flow 300 may include the UE 104 sending a radio resource control (RRC) capability report 308 to the serving access node 108. The RRC capability report 308 may include positioning capability information related to whether the UE 104 supports a positioning operation such as, for example, an OTDOA operation, or measurement in NR-U. The access node 108 may process the RRC signaling to obtain the positioning capability information. The access node 108 may then generate and send a New Radio positioning protocol A (NRPPa) capability report 312, including the positioning capability information, to the LMF 120. Except as otherwise described, the NRPPa signaling performed by the UE 104 and LMF 120 may be consistent with 3GPP TS 38.455 v16.0.0 (2020 July).

In this manner, the positioning call flows 200 and 300 may be used to provide the LMF 120 with the appropriate positioning capability information regarding whether the UE 104 supports positioning operations/measurements in an unlicensed spectrum. The LMF 120 may use this information to properly configure the UE 104. In other embodiments, additional/alternative techniques may be used to facilitate positioning in unlicensed spectrum. For example, the UE 104, supporting one or more positioning operations/measurements in NR-U, may extend a positioning measurement period in some instances.

Figure 4:
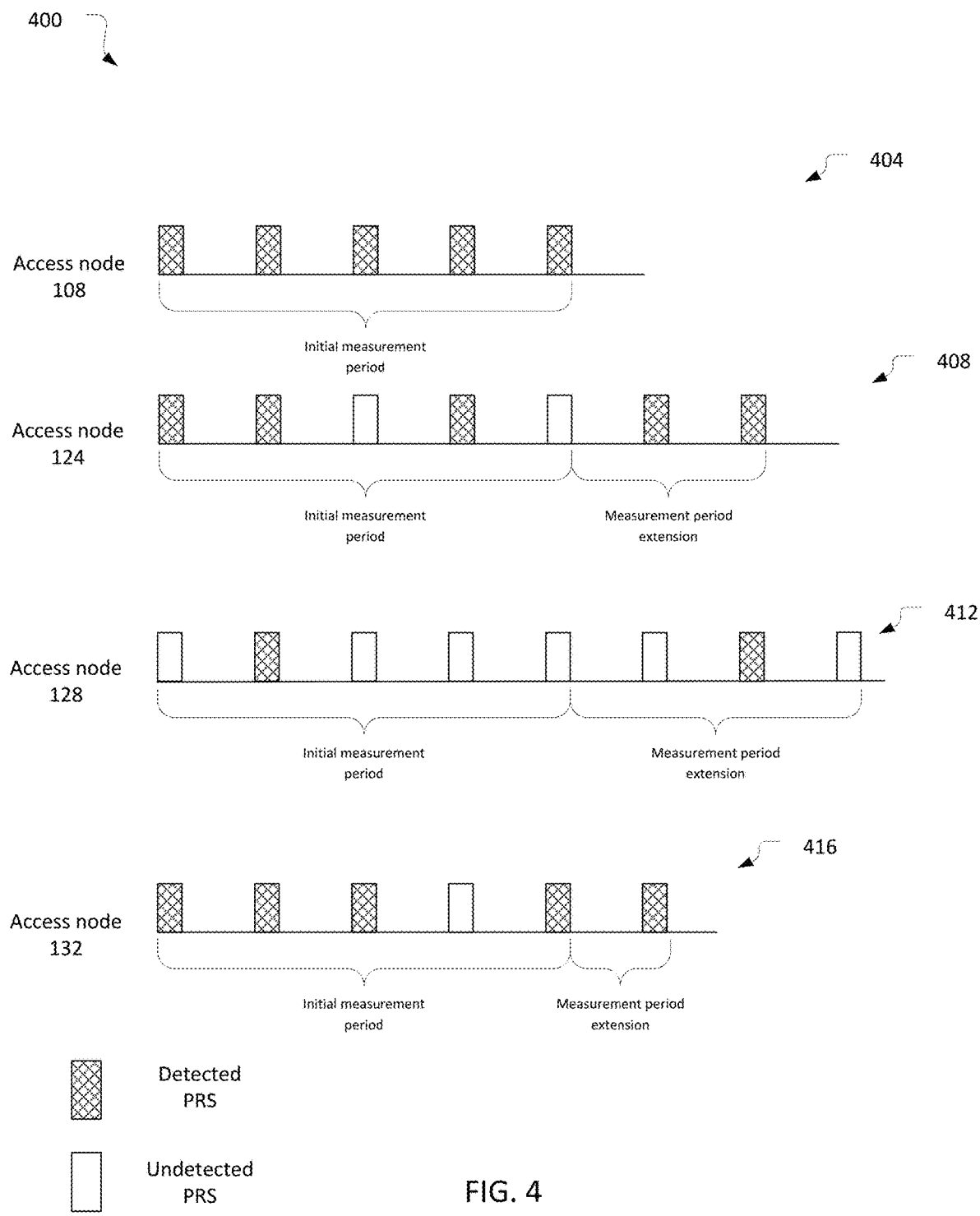
FIG. 4 illustrates a positioning procedure in accordance with some embodiments.

FIG. 4 illustrates a positioning procedure 400 in accordance with some embodiments. The positioning procedure 400 may include measurements corresponding to PRSs from a number of access nodes. For example, the positioning procedure 400 may include measurements 404, 408, 412, and 416 respectively corresponding to PRSs from access nodes 108, 124, 128, and 132.

The UE 104 may be configured with an initial measurement period to accommodate a number of PRS occasions. As shown, the initial measurement period may include five PRS occasions with corresponding PRS periodicities. In measurement 404, the UE 104 may detect the PRS in all five PRS occasions and may, therefore, successfully perform a corresponding PRS measurement. This successful PRS measurement may be used as a basis for an RSTD measurement. The number of PRS occasions within the initial measurement period may vary, as will the detected number of PRSs within said PRS occasions needed to qualify as a successful PRS measurement.

In measurement 408, the UE 104 may detect the PRS in three out of the five PRS occasions. The undetected PRS at PRS occasions three and five may compromise the PRS measurement of legacy devices. However, in embodiments of the present disclosure, the UE 104 may generate a measurement period extension to extend the positioning period. In some embodiments, the measurement period extension may have a length of L*Tprs, where L is a number of PRS occasions not available at the UE 104 during the initial measurement period (for example, the number of PRS occasions in which a PRS is not detected in the initial measurement period); Tprs is a PRS occasion periodicity for downlink positioning measurement; and $L \leq L_{max}$, where $L_{max}$ is a maximum number of PRS periodicities (or PRS occasions) that the UE may extend due to LBT failure. L and $L_{max}$ may be positive integers.

The UE 104 may detect two additional PRS transmissions in the measurement period extension of the measurement 408. Therefore, the UE 104 may successfully perform a corresponding PRS measurement in the measurement 408.

The position measurement period of the measurement 408 may include both the initial measurement period (having five PRS occasions) and the measurement period extension (having two PRS occasions).

In some embodiments, a UE may keep extending a detection window until the available occasions (for example, the PRS occasions in which the PRS is detected) reaches a desired number or until the measurement period extension equals $L_{max}$. Thus, in some embodiments, the UE 104 may not extend the measurement period extension to its maximum extent if the desired number of available occasions is reached before that occurs.

In measurement 412, the UE 104 may detect the PRS transmitted by access node 128 in only one PRS occasion of the five PRS occasions. Consider, for this situation, that the $L_{max}$ is set to three. Although the PRS was undetected at four PRS occasions in the initial measurement period, the measurement period extension is only capable of having a length of three PRS periodicities. As shown, the PRS is detected in one of the three PRS occasions of the measurement period extension. In some instances, detecting the PRS in two of eight PRS occasions may be insufficient to perform a corresponding PRS measurement.

Upon exceeding $L_{max}$ during the position measurement period without detecting the PRS in a sufficient number of PRS occasions, the UE 104 may perform different options in different embodiments. In a first option, the UE 104 may terminate the positioning measurement on the specific PRS (for example, the PRS whose measurement has been extended by $L_{max}*T_{prs}$ without detecting the PRS in a sufficient number of PRS occasions). Thus, with reference to FIG. 4, the UE 104 may terminate the positioning measurement based on the PRS transmitted by access node 128. In some embodiments, along with terminating the positioning measurement on the specific PRS, the UE 104 may generate and transmit a message to the LMF 120 to indicate that the specific PRS cannot be detected even with the $L_{max}$ additional attempts.

In another option, the UE 104 may restart the positioning measurement on the specific PRS from the beginning. For example, the UE 104 may again attempt to detect the PRS in PRS occasions of an initial measurement period followed by a measurement extension period, if needed. In some embodiments, a predetermined number of positioning measurements may be attempted before terminating the positioning measurement.

In measurement 416, the UE 104 may detect the PRS transmitted by access node 132 in four PRS occasions of the five possible PRS occasions. In this case, the measurement period extension may have a length of one PRS periodicity, in which the PRS is detected in the corresponding PRS occasion. Therefore, the UE 104 may successfully perform a corresponding PRS measurement in measurement 416.

In some embodiments, a positioning procedure may be compromised if more than a predetermined number of PRS positioning measurements are terminated (for example, they exceed the $L_{max}$ attempts on measurement during the position measurement period without detecting the PRS in a sufficient number of PRS occasions). For example, in some embodiments a positioning procedure may require three or more successful PRS measurements in order to support RSTD measurements that may be reported to the LMF 120. If more than the predetermined number of PRS positioning measurements are terminated, the UE 104 may perform various options. In a first option, the UE 104 may terminate the whole positioning procedure. In some embodiments, along with terminating the positioning procedure, the UE 104 may generate and transmit a message to the LMF 120 to indicate failure of the positioning procedure. In some embodiments, the message may be generated and transmitted via LPP.

In another option, the UE 104 may restart the positioning procedure from the beginning. For example, the UE may restart each positioning measurement that is configured by the assistance data in an attempt to obtain a sufficient number of PRS measurements.

The embodiment described above with respect to FIG. 4 includes extending the initial measurement period in the event the PRS is not detected in one or more PRS occasions. In other embodiments, UEs that support OTDOA/PRS measurement in NR-U may not extend the initial measurement period due to an LBT failure. In some embodiments, if more than Y PRSs cannot be detected during the position measurement period, the UE 104 may perform various options. The parameter Y may be a positive integer that is preconfigured to the UE 104.

In a first option, the UE 104 may terminate the whole positioning procedure. In some embodiments, along with terminating the positioning procedure, the UE 104 may generate and transmit a message to the LMF 120 to indicate failure of the positioning procedure. The message may be generated and transmitted via LPP.

In another option, the UE 104 may restart the positioning procedure from the beginning. For example, the UE may restart each positioning measurement that is configured by the assistance data in an attempt to obtain a sufficient number of PRS measurements.

In this manner, the UE 104 may adjust its positioning operations based on a potential non-transmission of a PRS due to an LBT failure. In other embodiments, additional/alternative processes may be used by other components to facilitate positioning measurements in an unlicensed spectrum. For example, in some embodiments, correspondence between the access nodes and the LMF 120 may facilitate positioning operations in NR-U.

Figure 5:
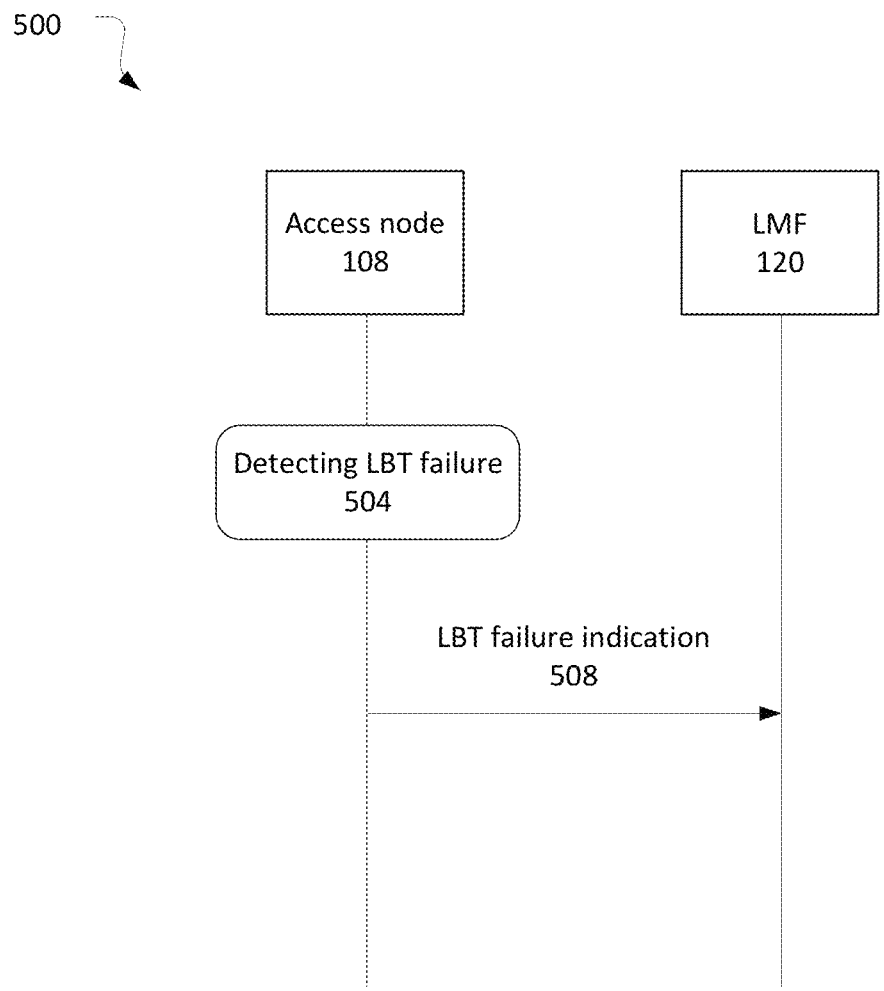
FIG. 5 illustrates a positioning call flow in accordance with some embodiments.

FIG. 5 illustrates a positioning call flow 500 in accordance with some embodiments. The positioning call flow 500 may include the access node 108 detecting an LBT failure at 504. The access node 108 may be operating in NR-U and may attempt to obtain the channel in order to transmit the PRS in one or more PRS occasions. The LBT failure may occur in the event that unlicensed carrier is occupied or otherwise not available to the access node 108 at the time needed to transmit the PRS in the one or more PRS occasions.

The positioning call flow 500 may further include the access node 108 sending an LBT failure indication 508 to the LMF 120. The LBT failure indication 508 may be transmitted via NRPPa and may include LBT failure information. The LBT failure information may include information corresponding to the PRS, the entity transmitting the PRS, or timing information corresponding to the LBT failure. For example, the LBT failure information may include, but is not limited to: a physical cell identity (PCI) of the access node 108; a transmit-receive point index of a TRP that was to transmit the PRS; a PRS configuration index of the PRS; or timing information that indicates when the access node 108 experienced the LBT failure that muted the PRS transmission.

The LMF 120 may use the LBT failure indication 508 to filter positioning measurement reports. For example, if the LMF 120 receives positioning measurement result from the UE 104 for PRS transmitted by the access node 108 and the LMF 120 had previously received the LBT failure indication 508 from the access node 108, the LMF 120 may determine to filter out the PRS measurement results associated with the access node 108 due to the LBT failure.

Figure 6:
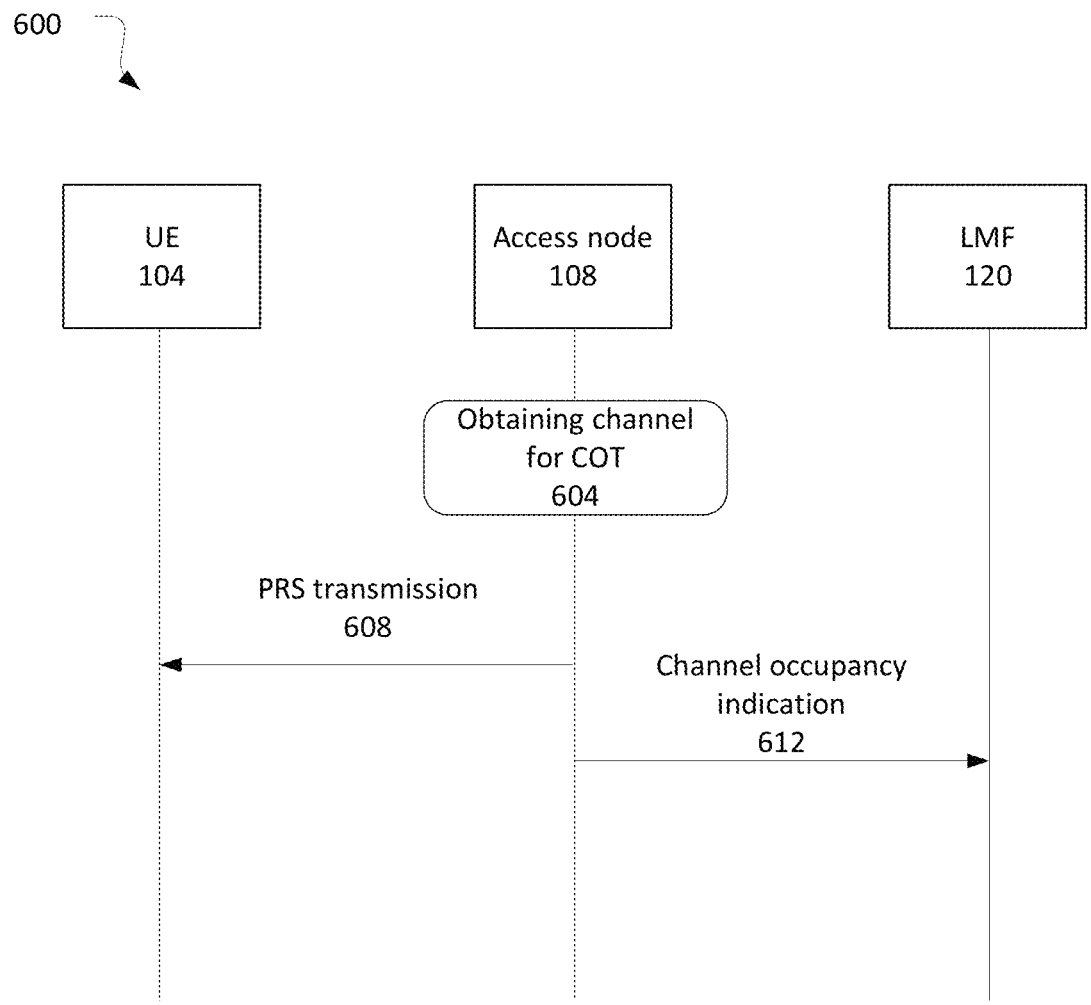
FIG. 6 illustrates a positioning call flow in accordance with some embodiments.

FIG. 6 illustrates a positioning call flow 600 in accordance with some embodiments. The positioning call flow 500 may include the access node 108 obtaining a channel for a period of time, which may be referred to as a channel occupancy duration (COD). The access node 108 may be guaranteed channel occupancy for the COD. The channel may be obtained based on a successful LBT operation. The access node 108 may transmit PRS transmissions 608 to the UE 104 to serve as a basis for a positioning operation.

The positioning call flow 600 may further include the access node 108 generating and transmitting a channel occupancy indication 612 to the LMF 120. The channel occupancy indication 612 may include channel occupancy information to indicate, to the LMF 120, that the access node 108 acquired the channel for the COD. The LMF may use the channel occupancy information to validate corresponding PRS transmissions within a time period that corresponds to the COD. For example, if the LMF 120 receives an indication from the UE 104 that a positioning measurement failed with respect to the access node 108 at a time in which the access node had obtained the channel. The LMF 120 may then reliably determine that the access node 108 successfully transmitted the PRS via the acquired channel, even if the PRS was not successfully received by the UE 104. Thus, the LMF 120 may determine that the non-detection of the PRS transmitted by the access node 108 was due to factors other than an LBT failure, for example, long propagation delays.

The channel occupancy information may include, but is not limited to: a PCI of the access node 108; a TRP index of a TRP that transmits the PRS; a PRS configuration index of the PRS; a starting point of the COD; or a number of available PRS occasions after the starting point of the COD or a time duration of the COD.

While the positioning call flows 500 and 600 are shown with the access node 108, which is described in FIG. 1 as the serving access node, similar positioning call flows may be performed by other, non-serving access nodes.

Figure 7:
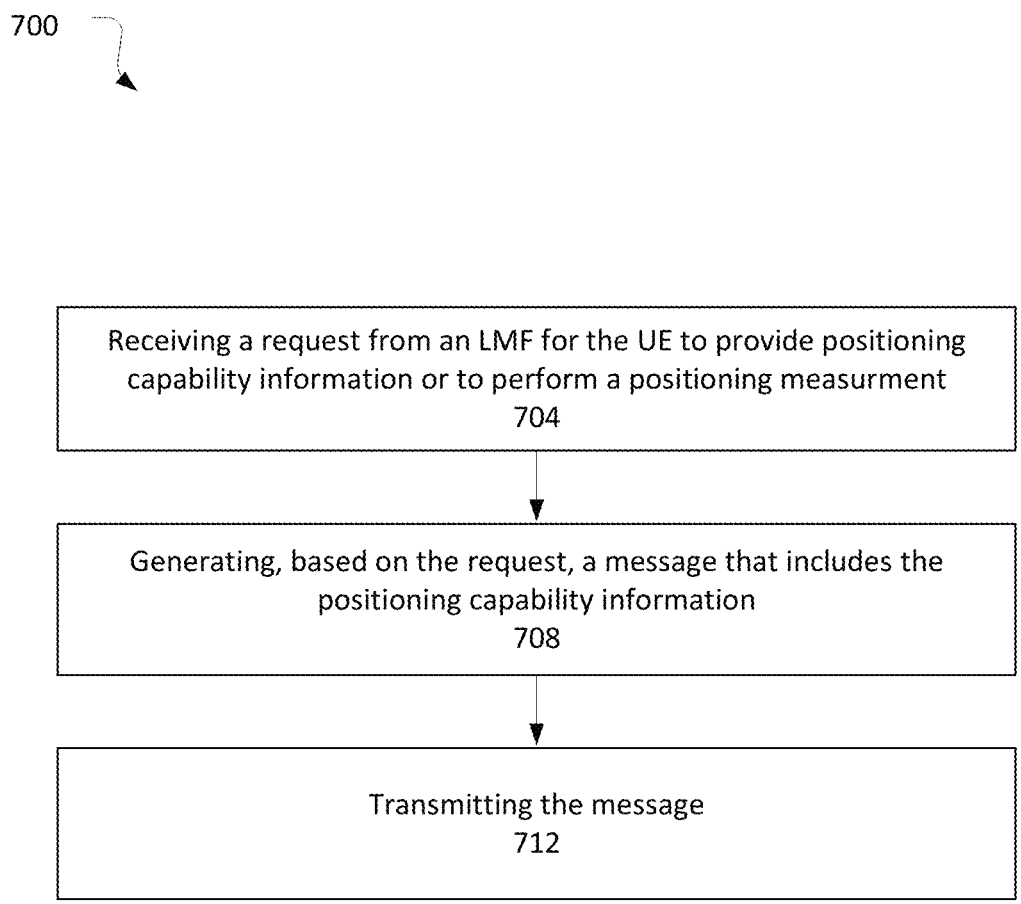
FIG. 7 illustrates an operational flow/algorithmic structure in accordance with some embodiments.

FIG. 7 includes an operation flow/algorithmic structure 700 in accordance with some embodiments. The operation flow/algorithmic structure 700 may be performed or implemented by a UE such as, for example, UE 104 or 1000; or components thereof, for example, baseband processor 1004A.

The operation flow/algorithmic structure 700 may include, at 704, receiving a request from an LMF for the UE to provide positioning capability information or to perform a positioning measurement.

In embodiments in which the request is to provide positioning capability information, the request may be received from the LMF before a request to perform a positioning measurement. The request to perform the positioning measurement may be subsequently transmitted from the LMF and may also include assistance data on neighboring access cells/PRSs.

In embodiments in which the request is to perform the positioning measurement, the request may additionally include the assistance data on neighboring access cells/PRSs.

The operation flow/algorithmic structure 700 may further include, at 708, generating a message that includes the positioning capability information. The message may be generated based on the request received at 704.

In various embodiments, the positioning capability information may indicate whether the UE supports a particular positioning operation/measurement in unlicensed spectrum. For example, the positioning capability information may indicate whether the UE supports an OTDOA positioning operation or PRS measurements in NR-U or on CCA carriers. For another example, the positioning capability information may indicate whether the UE supports multiple RTT positioning operations in NR-U or on CCA carriers.

The operation flow/algorithmic structure 700 may further include, at 712, transmitting the message generated at 708. In various embodiments, the message that includes the positioning capability information may be transmitted to a serving access node via an RRC message, or transmitted to an LMF via an LPP message.

FIG. 8 includes an operation flow/algorithmic structure 800 in accordance with some embodiments. The operation flow/algorithmic structure 800 may be performed or implemented by a UE such as, for example, UE 104 or 1000; or components thereof, for example, baseband processor 1004A.

The operation flow/algorithmic structure 800 may include, at 804, performing one or more positioning measurements on a reference signal. The reference signal may be a PRS, CSI-RS, or SSB transmitted by a serving access node or a neighboring access node. The positioning measurements may be any measurements that support positioning operations including, but not limited to, PRS measurements, OTDOA measurements, multiple RTT measurements, RSTD measurements, etc. In some embodiments, the performing of the measurements on the reference signal may be done in an initial measurement period on one or more reference signal occasions. A reference signal occasion, as used herein, includes time/frequency resources in which a reference signal may be transmitted.

The operation flow/algorithmic structure 700 may further include, at 708, determining a number of reference signal occasions in which the reference signal is not available. For example, the UE may determine how many reference signal occasions within the initial measurement period do not include a reference signal for positioning purposes. A reference signal may be determined to not be available if it is not properly received, processed, or otherwise detected in the corresponding reference signal occasion.

The operation flow/algorithmic structure 700 may further include, at 712, extending the measurement period based on the number determined at 708. In some embodiments, the initial measurement period may be extended by a duration that corresponds to a product of the number determined at 708 and a periodicity of the reference signal occasions. In other embodiments, the measurement period may be extended by other durations.

In various embodiments, the measurement period may be extended up to a maximum total measurement period. If the reference signal is detected in a sufficient number of reference signal occasions of the maximum total measurement period, the position measurement may be considered a success. Otherwise, the position measurement may fail. In the event a position measurement fails, the UE may terminate or restart the position measurement and, optionally, report a failure of the position measurement to the LMF.

Figure 9:
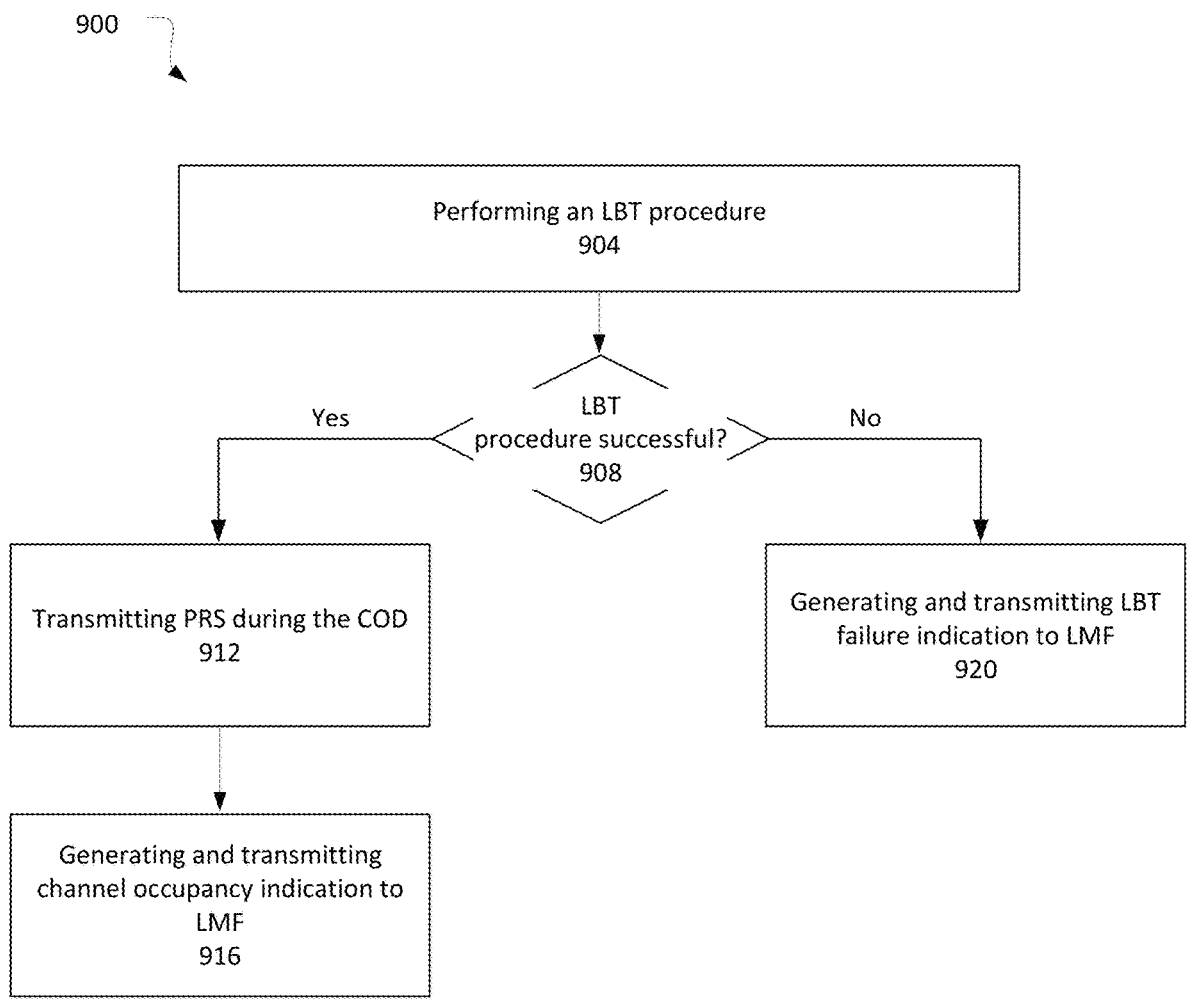
FIG. 9 illustrates an operational flow/algorithmic structure in accordance with some embodiments.

FIG. 9 includes an operation flow/algorithmic structure 900 in accordance with some embodiments. The operation flow/algorithmic structure 900 may be performed or implemented by an access node or network node such as, for example, access node 108 or network node 1100; or components thereof, for example, baseband processor 1104A.

The operation flow/algorithmic structure 900 may include, at 904, performing LBT procedure. The LBT procedure may include the access node performing a CCA to determine whether a channel is occupied.

The operation flow/algorithmic structure 900 may further include, at 908, determining whether the LBT procedure was successful. If the LBT procedure is successful (for example, the CCA indicates that the channel is not occupied), the access node may take over the channel for a period of time, for example, the COD. The LBT procedure may be considered not successful if the CCA indicates that the channel is occupied. The access node may then schedule another CCA after a preconfigured backup interval in an attempt to acquire the channel at a later time.

If the UE determines that the LBT procedure was successful at 908, the operation flow/algorithmic structure 900 may further include transmitting a PRS during a channel occupancy duration at 912. The PRS may be transmitted in one or more PRS occasions. The time/frequency resources the correspond to the PRS occasions may be defined in a PRS configuration.

The operation flow/algorithmic structure 900 may further include, at 916, generating in transmitting a channel occupancy indication to an LMF. The channel occupancy indication may include channel occupancy information such as that described above with respect to FIG. 6. The channel occupancy indication may be transmitted to the LMF via NRPPa and may be used by the LMF to validate the PRS transmitted at 912.

If the UE determines that the LBT procedure was not successful at 908, the operation flow/algorithmic structure 900 may further include generating and transmitting and LBT failure indication to the LMF. The LBT failure indication may include LBT failure information such as that described above with respect to FIG. 5. The LBT failure indication may be transmitted to the LMF via NRPPa.

Figure 10:
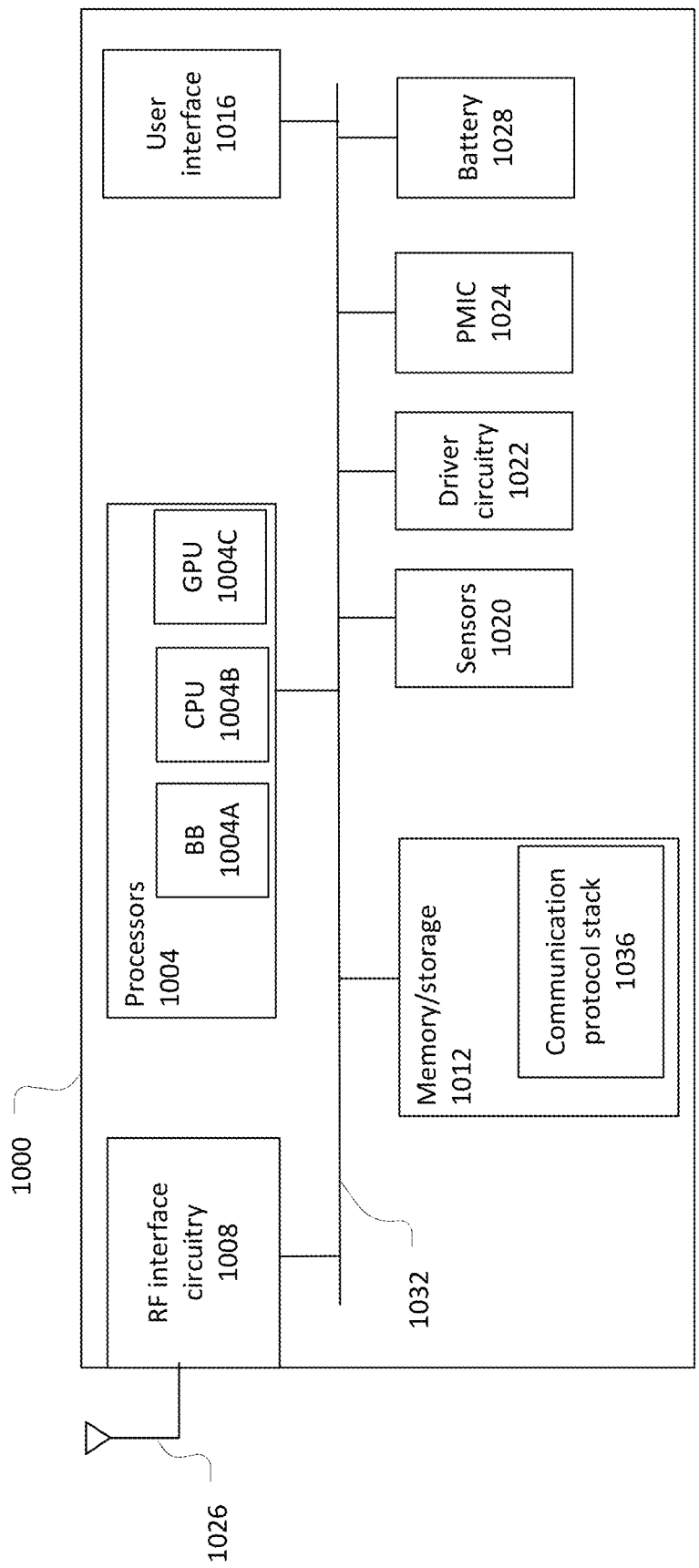
FIG. 10 illustrates a user equipment in accordance with some embodiments.

FIG. 10 illustrates a UE 1000 in accordance with some embodiments. The UE 1000 may be similar to and substantially interchangeable with UE 104 of FIG. 1.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/monitoring devices (for example, cameras, video cameras, etc.) wearable devices; Internet-of-Things (IoT) devices.

The UE 1000 may include processors 1004, RF interface circuitry 1008, memory/storage 1012, user interface 1016, sensors 1020, driver circuitry 1022, power management integrated circuit (PMIC) 1024, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangements of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some embodiments, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum (NAS) layer. In some embodiments, the PHY layer operations may additionally/alternatively be performed by the components of the RF interface circuitry 1008.

The baseband processor circuitry 1004A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The baseband processor circuitry 1004A may access instructions that cause the UE to perform positioning measurements in an unlicensed spectrum and signal corresponding positioning capabilities as described herein.

The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various embodiments, the RF interface circuitry 1008 may be configured to transmit/receive signals in a manner compatible with NR access technologies.

The antenna 1026 may include a number of antenna elements that each convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in FR1 or FR2.

The user interface circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1022 may include software and hardware elements that operate to control particular devices that are embedded in the UE 1000, attached to the UE 1000, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensor circuitry 1020 and control and allow access to sensor circuitry 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

In some embodiments, the PMIC 1024 may control, or otherwise be part of, various power saving mechanisms of the UE 1000. For example, if the platform UE is in an RRC_Connected state where it is still connected to the RAN node as it expects to receive traffic shortly, then it may enter a state known as Discontinuous Reception Mode (DRX) after a period of inactivity. During this state, the UE 1000 may power down for brief intervals of time and thus save power. If there is no data traffic activity for an extended period of time, then the UE 1000 may transition off to an RRC Idle state, where it disconnects from the network and does not perform operations such as channel quality feedback, handover, etc. The UE 1000 goes into a very low power state and it performs paging where again it periodically wakes up to listen to the network and then powers down again. The UE 1000 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1028 may power the UE 1000, although in some examples the UE 1000 may be mounted deployed in a fixed location, and may have a power supply coupled to an electrical grid. The battery 1028 may be a lithium ion battery or a metal-air battery, such as a zinc-air battery, an aluminum-air battery, or a lithium-air battery. In some implementations, such as in vehicle-based applications, the battery 1028 may be a typical lead-acid automotive battery.

Figure 11:
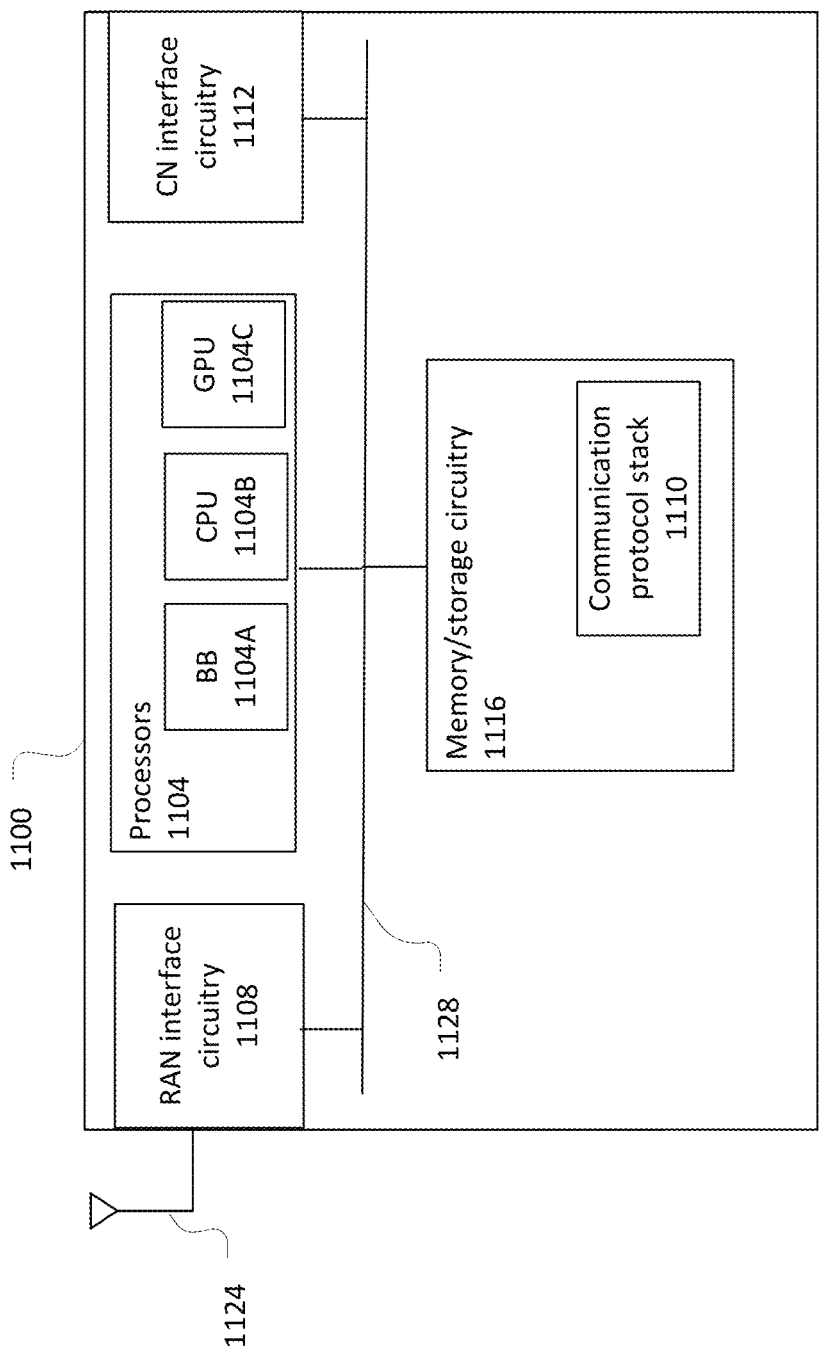
FIG. 11 illustrates a network node in accordance with some embodiments.

FIG. 11 illustrates a network node 1100 in accordance with some embodiments. The network node 1100 may similar to and substantially interchangeable with access node 108. Alternatively, the network node 1100 may implement an LMF such as LMF 120 in 5GC network 112.

The network node 1100 may include processors 1104, RF interface circuitry 1108, core network (CN) interface circuitry 1112, and memory/storage circuitry 1116. In the event the network node 1100 implements the LMF 120, it may not include components needed to communicate over an air interface such as, for example, the RF interface circuitry 1108 or antenna 1124.

The components of the network node 1100 may be coupled with various other components over one or more interconnects 1128.

The processors 1104, RF interface circuitry 1108, memory/storage circuitry 1116 (including communication protocol stack 1110), antenna 1124, and interconnects 1128 may be similar to like-named elements shown and described with respect to FIG. 10.

The processors 1104 may execute instructions to cause the network node 1100 to perform positioning signaling and operations as described with respect to the access node 108 or the LMF 120 as described herein.

The CN interface circuitry 1112 may provide connectivity to one or more components of a core network, for example, a 5GC network (for example, 5GC network 112) using a 5GC-compatible network interface protocol such as carrier Ethernet protocols, or some other suitable protocol. Network connectivity may be provided to/from the access network node 1100 via a fiber optic or wireless backhaul. The CN interface circuitry 1112 may include one or more dedicated processors or FPGAs to communicate using one or more of the aforementioned protocols. In some implementations, the CN interface circuitry 1112 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a user equipment (UE), the method comprising: receiving, from a location management function (LMF), a request for the UE to provide positioning capability information or to perform a positioning measurement; and generating, based on the request, a message that includes the positioning capability information to indicate whether the UE supports positioning operations in an unlicensed spectrum; and transmitting the message.

Example 2 includes the method of example 1 or some other example herein, wherein transmitting the message comprises: transmitting the message to the LMF via a long term evolution positioning protocol (LPP) or transmitting the message to a serving base station via radio resource control (RRC) signaling.

Example 3 includes the method of example 1 or some other example herein, wherein the positioning capability information is to indicate whether the UE supports an over-the-air, direction-of arrival (OTDOA) positioning operation on clear channel assessment (CCA) carriers.

Example 4 includes the method of example 1 or some other example herein, wherein the positioning capability information is to indicate whether the UE supports positioning reference signal (PRS) measurements on clear channel assessment (CCA) carriers.

Example 5 includes the method of example 1 or some other example herein, wherein the positioning capability information is to indicate whether the UE supports a multiple round-trip time positioning operation on clear channel assessment (CCA) carriers.

Example 6 includes the method of example 1 or some other example herein, wherein the request is for the UE to provide the positioning capability information.

Example 7 includes the method of example 1 or some other example herein, wherein the request is for the UE to perform the positioning measurement.

Example 8 includes a method of operating a UE, the method comprising: performing one or more positioning measurements on a reference signal received in reference signal occasions within a measurement period of an unlicensed spectrum; determining a number of reference signal occasions in which the reference signal is not available for positioning measurements during the measurement period; and extending the measurement period based on the number.

Example 9 includes the method of example 8 or some other example herein, further comprising: extending the measurement period based on a product of the number and a periodicity of the reference signal occasions.

Example 10 includes the method of example 8 or some other example herein, further comprising: determining a number of reference signal occasions in which the reference signal is received within the measurement period as extended is less than a predetermined number; and terminating or restarting measurement of the reference signal based on the determining that the number of reference signal occasions in which the reference signal is received within the measurement period as extended is less than the predetermined number.

Example 11 includes the method of example 10 or some other example herein, wherein said terminating or restarting comprises terminating the measurement of the reference signal.

Example 12 includes the method of example 11 or some other example herein, further comprising: sending, to a location management function (LMF), an indication of an undetectable reference signal.

Example 13 includes the method of example 12 or some other example herein, wherein the indication comprises an index of the reference signal.

Example 14 includes the method of example 11 or some other example herein, further comprising: determining a plurality of measurements of reference signals that are terminated is greater than a predetermined threshold; terminating or restarting a positioning procedure based on said determining the plurality of measurements of reference signals that are terminated is greater than the predetermined threshold.

Example 15 includes the method of example 14 or some other example herein, wherein terminating or restarting comprises terminating the positioning procedure and the method further comprises: sending, to a location management function (LMF), a failure indication corresponding to the positioning procedure.

Example 16 includes a method of operating a UE, the method comprising: determining a plurality of reference signals are undetectable for positioning measurements within a measurement period on one or more clear channel assessment (CCA) carriers; and terminating or restarting a positioning procedure based on said determining the plurality of reference signals are undetectable for positioning measurements within the measurement period.

Example 17 includes the method of example 14 or some other example herein, wherein terminating or restarting comprises terminating the positioning procedure and the method further comprises: sending, to a location management function (LMF), a failure indication corresponding to the positioning procedure via long term evolution positioning protocol (LPP).

Example 18 includes a method of operating an access node, the method comprising: detecting a listen-before-talk (LBT) failure that mutes a reference signal to be transmitted for a positioning measurement within an unlicensed spectrum; and transmitting information corresponding to the LBT failure to a location management function (LMF).

Example 19 includes the method of example 18 or some other example herein, wherein the information includes an indication of: a physical cell identity of the access node; a transmit-receive point index; a reference signal configuration index; or a time of the LBT failure.

Example 20 includes the method of example 18 or some other example herein, wherein transmitting the information comprises: transmitting the information in a new radio positioning protocol A (NRPPa) message.

Example 21 includes a method of operating an access node, the method comprising: performing a listen-before-talk (LBT) procedure to obtain a channel within an unlicensed spectrum for a channel occupancy duration (COD); transmitting a reference signal in the channel and within the COD for a positioning measurement; and transmitting channel occupancy information corresponding to the COD to a location management function (LMF).

Example 22 includes the method of example 21 or some other example herein, wherein the channel occupancy information includes an indication of: a physical cell identity of the access node; a transmit-receive point index; a reference signal configuration index; a starting point of the COD; a number of available reference signal occasions within the COD; or a time duration of the COD.

Example 23 includes the method of example 21 or some other example herein, wherein transmitting the channel occupancy information comprises: transmitting the channel occupancy information in a new radio positioning protocol A (NRPPa) message.

Example 24 includes a method of operating a location management function (LMF), the method comprising: receiving, from an access node, an indication of a listen-before-talk (LBT) failure or a channel occupancy indication; receiving measurement results; and processing the measurement results based on the indication.

Example 25 includes the method of example 24 or some other example herein, wherein the indication is an indication of the LBT failure and the processing of the measurement results includes filtering the measurements based on the LBT failure.

Example 26 may include an apparatus comprising means to perform one or more elements of a method described in or related to any of examples 1-25, or any other method or process described herein.

Example 27 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 may include an apparatus comprising logic, modules, or circuitry to perform one or more elements of a method described in or related to any of examples 1-25, or any other method or process described herein.

Example 29 may include a method, technique, or process as described in or related to any of examples 1-25, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-25, or portions thereof.

Example 31 may include a signal as described in or related to any of examples 1-25, or portions or parts thereof.

Example 32 may include a datagram, information element, packet, frame, segment, PDU, or message as described in or related to any of examples 1-25, or portions or parts thereof, or otherwise described in the present disclosure.

Example 33 may include a signal encoded with data as described in or related to any of examples 1-25, or portions or parts thereof, or otherwise described in the present disclosure.

Example 34 may include a signal encoded with a datagram, IE, packet, frame, segment, PDU, or message as described in or related to any of examples 1-25, or portions or parts thereof, or otherwise described in the present disclosure.

Example 35 may include an electromagnetic signal carrying computer-readable instructions, wherein execution of the computer-readable instructions by one or more processors is to cause the one or more processors to perform the method, techniques, or process as described in or related to any of examples 1-25, or portions thereof.

Example 36 may include a computer program comprising instructions, wherein execution of the program by a processing element is to cause the processing element to carry out the method, techniques, or process as described in or related to any of examples 1-25, or portions thereof.

Example 37 may include a signal in a wireless network as shown and described herein.

Example 38 may include a method of communicating in a wireless network as shown and described herein.

Example 39 may include a system for providing wireless communication as shown and described herein.

Example 40 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. One or more non-transitory computer-readable media (NTCRM) having instructions that, when executed by one or more processors, cause a user equipment (UE) to:
receive, from a location management function (LMF), a request for the UE to provide a positioning capability or to perform a positioning measurement;
generate, based on the request, a message that includes positioning capability information to indicate whether the UE supports positioning operations in an unlicensed spectrum, wherein UE support for positioning operations in the unlicensed spectrum is separate from UE support for positioning operations in a licensed spectrum; and
transmit the message.

2. The one or more NTCRM of claim 1, wherein the UE is to transmit the message to the LMF via a long term evolution positioning protocol (LPP) or to a serving base station via radio resource control (RRC) signaling.

3. The one or more NTCRM of claim 1, wherein the positioning capability information is to indicate whether the UE supports an over-the-air, direction-of arrival (OTDOA) positioning operation on clear channel assessment (CCA) carriers.

4. The one or more NTCRM of claim 1, wherein the positioning capability information is to indicate whether the UE supports positioning reference signal (PRS) measurements on clear channel assessment (CCA) carriers.

5. The one or more NTCRM of claim 1, wherein the positioning capability information is to indicate whether the UE supports a multiple round-trip time positioning operation on clear channel assessment (CCA) carriers.

6. The one or more NTCRM of claim 1, wherein the request is for the UE to provide the positioning capability information.

7. The one or more NTCRM of claim 1, wherein the request is for the UE to perform the positioning measurement.

8. The one or more NTCRM of claim 1, wherein the positioning capability information is to indicate the UE supports positioning operations in the unlicensed spectrum and the instructions, when executed, further cause the UE to:
extend a predetermined positioning measurement period for a positioning operation in the unlicensed spectrum.

9. A user equipment (UE) comprising:
radio-frequency (RF) interface circuitry; and
processing circuitry coupled with the RF interface circuitry, the processing circuitry to:
receive, from a location management function (LMF) via the RF interface circuitry, a request for the UE to provide a positioning capability or to perform a positioning measurement;
generate, based on the request, a message that includes positioning capability information to indicate whether the UE supports positioning operations in an unlicensed spectrum, wherein UE support for positioning operations in the unlicensed spectrum is separate from UE support for positioning operations in a licensed spectrum; and
transmit, via the RF interface circuitry, the message.

10. The UE of claim 9, wherein the processing circuitry is further to transmit the message to the LMF via a long term evolution positioning protocol (LPP) or to a serving base station via radio resource control (RRC) signaling.

11. The UE of claim 9, wherein the positioning capability information is to indicate whether the UE supports an over-the-air, direction-of arrival (OTDOA) positioning operation on clear channel assessment (CCA) carriers.

12. The UE of claim 9, wherein the positioning capability information is to indicate whether the UE supports positioning reference signal (PRS) measurements on clear channel assessment (CCA) carriers.

13. The UE of claim 9, wherein the positioning capability information is to indicate whether the UE supports a multiple round-trip time positioning operation on clear channel assessment (CCA) carriers.

14. The UE of claim 9, wherein the request is for the UE to provide the positioning capability information or to perform the positioning measurement.

15. A method of operating a location management function (LMF), the method comprising:
transmitting, to a user equipment (UE), a request for the UE to provide a positioning capability or to perform a positioning measurement; and
receiving, from the UE, a message that includes positioning capability information to indicate whether the UE supports positioning operations in an unlicensed spectrum, wherein UE support for positioning operations in the unlicensed spectrum is separate from UE support for positioning operations in a licensed spectrum.

16. The method of claim 15, further comprising:
receiving, from a base station, an indication of a listen-before-talk (LBT) failure that mutes a reference signal to be transmitted for a positioning measurement within an unlicensed spectrum; and
filtering positioning measurement results based on the indication.

17. The method of claim 15, further comprising:
generating assistance data to configure positioning measurements based on the positioning capability information; and
transmitting the assistance data to the UE.

18. The method of claim 15, wherein the positioning capability information is to indicate whether the UE supports an over-the-air, direction-of arrival (OTDOA) positioning operation on clear channel assessment (CCA) carriers.

19. The method of claim 15, wherein the positioning capability information is to indicate whether the UE supports positioning reference signal (PRS) measurements on clear channel assessment (CCA) carriers.

20. The method of claim 15, wherein the positioning capability information is to indicate whether the UE supports a multiple round-trip time positioning operation on clear channel assessment (CCA) carriers.

* * * * *